US 6,636,841 B1

(12) United States Patent
Austin et al.

(10) Patent No.: US 6,636,841 B1
(45) Date of Patent: Oct. 21, 2003

(54) SYSTEM AND METHOD FOR TELECOMMUNICATIONS SYSTEM FAULT DIAGNOSTICS

(75) Inventors: James Austin, Fimber Driffield (GB); Ping Zhou, Heslington (GB)

(73) Assignee: Cybula Ltd., Driffield (GB)

( * ) Notice: Subject to any disclaimer, the term of this patent is extended or adjusted under 35 U.S.C. 154(b) by 0 days.

(21) Appl. No.: 09/402,281

(22) PCT Filed: Mar. 23, 1998

(86) PCT No.: PCT/US98/05736

§ 371 (c)(1),
(2), (4) Date: Feb. 11, 2000

(87) PCT Pub. No.: WO98/44428

PCT Pub. Date: Oct. 8, 1998

(30) Foreign Application Priority Data

Apr. 1, 1997 (GB) ............................................. 9706521

(51) Int. Cl.[7] ............................................. G06F 15/18
(52) U.S. Cl. ............................ 706/20; 706/21; 706/16
(58) Field of Search ............................. 706/20, 21, 16

(56) References Cited

U.S. PATENT DOCUMENTS

| | | | |
|---|---|---|---|
| 5,166,927 A | 11/1992 | Iida et al. ................. 370/238 |
| 5,293,323 A | 3/1994 | Doskocil et al. ........... 702/185 |
| 5,359,699 A * | 10/1994 | Tong et al. .................. 706/20 |
| 5,440,566 A | 8/1995 | Spence et al. ................ 374/41 |
| 5,442,555 A | 8/1995 | Reifman et al. ............. 701/99 |
| 5,465,321 A | 11/1995 | Smyth ......................... 706/20 |
| 5,537,327 A | 7/1996 | Snow et al. ................ 700/293 |
| 5,544,308 A | 8/1996 | Giordano et al. ........... 714/26 |
| 5,712,796 A * | 1/1998 | Ohura et al. ................. 702/59 |
| 5,778,184 A | 7/1998 | Brownmiller et al. ...... 709/224 |
| 6,014,652 A * | 1/2000 | Hill et al. ..................... 706/16 |
| 6,405,184 B1 * | 6/2002 | Böhme et al. ................ 706/20 |

FOREIGN PATENT DOCUMENTS

| | | |
|---|---|---|
| EP | 0712227 A2 | 5/1996 |
| WO | WO 94/19888 | 9/1994 |
| WO | WO 95/09463 | 4/1995 |
| WO | WO 96/10890 | 4/1996 |

OTHER PUBLICATIONS

Totton, et al., "Experience in Using Neural Networks for Electronics Diagnosis", Proceedings of the International Conference on Artificial Neural Networks, Nov. 18, 1991, pp. 115–118.

Saito, et al., "Autonomous Fault Diagnosis System Using Learning with Queries", IEEE, pp. 546–549 (1995).

Jiang, et al., "An Intelligent and Integrated System of Network Fault Management: Artificial Intelligence Technologies and Hybrid Architectures", Information Engineering, IEEE Singapore Int'l. Conf. on Networks, pp. 265–268 (1995).

Senjen, et al., "Hybrid Expert Systems for Monitoring and Fault Diagnosis", Artificial Intelligence Applications, pp. 235–241 (1993).

Totton, et al., "Experience in Using Neural Networks for Electronic Diagnosis", Artificial Neural Networks, pp. 115–118 (1991).

* cited by examiner

*Primary Examiner*—George B. Davis
(74) *Attorney, Agent, or Firm*—Hoffman & Baron, LLP

(57) ABSTRACT

A telecommunications fault location and diagnostic system employs a remote test unit (RTU) to collect system parameter data. The RTU is operatively coupled to a trained neural network, which receives the system parameter data from the RTU. The neural network is trained using pre-screened historical fault data, which is stored in a database. Once trained, the neural network classifies the RTU data into one of a predetermined number of fault probabilities.

12 Claims, 9 Drawing Sheets

SYSTEM AND METHOD FOR TELECOMMUNICATIONS SYSTEM FAULT DIAGNOSTICS

BACKGROUND OF THE INVENTION

Field of the Invention

The present invention relates generally to telecommunications system fault location, and more particularly relates to a system and method for telecommunications system fault diagnostics employing a neural network.

Telecommunication systems are generally complex electrical systems which are subject to failure from a variety of fault modes. The rapid and accurate classification and isolation of a fault within a telecommunications system is desired to minimize dispatch and repair costs associated with such faults. Therefore, it is a long standing objective within the telecommunications industry to provide a system which can use measured data to automatically diagnose one of several failure modes.

The accurate diagnosis of faults within a telecommunications system is hampered by the limited accessibility of test points within the system as well as the complex relationships between faults and measurable system parameters. An automated line test system (LTS) that is currently used to perform this function is illustrated in FIG. 1. In the LTS of FIG. 1, a remote test unit (RTU) 2 is employed at each local exchange (EX) 4 within the telecommunication system. The RTU 2 is a hardware device which generates test signals. These test signals are introduced into the system through the EX 4. The test signals propagate through a main distribution frame (MDF) 6 and into the telecommunications lines 8. The signals typically pass through a cross connect switch 10, to one or more distributing points (DP) 12. Ultimately the signals reach various customer apparatus (CA) 14 such as a modem, facsimile machine, telephone handset and the like.

The telecommunications system, when operating normally, exhibits characteristic parameters in response to the RTU 2 test signal. These parameters include voltage values, current values, resistance values, capacitance values and the like. The RTU 2 samples and evaluates these parameters through the use of software. During a fault condition, these parameters change in response to a given fault.

The diagnostic software 16 implements a simple heuristic algorithm. The algorithm includes decision rules which compare one or more measurements with predetermined (by an engineer) threshold values to determine whether a fault exists. As an example, the algorithm may compare measured resistance values between a pair of lines against a set of expected threshold values which are stored in the program to decide whether a fault exists in either an exchange 4 or customer apparatus 14. The algorithm uses linear decision rules to perform these functions.

The LTS is also capable of recording the measured parameters in a database 18 for future reference. Additionally, the LTS has the capability of accepting manually entered data regarding each fault from an operator via a keyboard. This information may include customer fault reports and service personnel "clear off" codes indicating the actual location of a fault. In this way, a large amount of data is assembled regarding fault history and parameter values associated with various fault locations. However, the LTS is unable to use this data to improve its own operation. If desired, the data stored in database 18 may be evaluated by an engineer periodically and the decision thresholds employed by the algorithm may be manually updated. This is an extremely labor intensive, and therefore expensive, operation. Therefore, it is a long standing objective in the field of telecommunication system diagnostics to develop a system which can overcome this limitation.

In diagnostic and fault location systems unrelated to telecommunications systems, neural networks have been employed to improve system performance. A neural network is a data processing system largely organized in parallel. The neural network includes a collection of processing elements, or neurons, which are mutually interconnected to one another. The various connections are known as neuronal interconnects. The network is typically formed with an input layer of neurons, an output layer of neurons and one or more hidden layers of neurons.

An important characteristic of neural networks is that they can "learn" by means of neural network training. During training, previously acquired measurement data is applied to the neural network input layer. An error signal is generated at the output layer and is back propagated through the hidden layers of the network. During this operation, the various weights associated with each neuronal interconnect are adjusted to minimize the error signal. If sufficient data is applied to the neural network, the neural network is able to classify unknown objects according to parameters established during training.

In U.S. Pat. No. 5,440,566 to Spence et al., a neural network is employed to perform fault detection and diagnosis for printed circuit boards. The neural network disclosed in the '566 patent is used to process thermal image data from an energized printed circuit board. The neural network is trained by applying data from a printed circuit board with known faults to the network. Once trained, the neural network is then able to analyze new data and classify the new data into one of a plurality of printed circuit board faults.

In U.S. Pat. No. 5,537,327 to Snow et al., a neural network is used in connection with a method and apparatus for detecting high impedance faults in electrical power transmission systems. The system disclosed in the '327 patent employs a trained neural network to evaluate fast Fourier transforms (FFT) of continuously acquired current measurements. The neural network continuously monitors the FFT data and activates a fault trigger output in the event a high impedance fault is detected.

Neural Network Technology

In general, neural networks can be viewed as a powerful approach to representing complex nonlinear discriminant functions in the form $y_k(x; W_k)$ where x is an input parameter and $W_k$ is an optimizing parameter within the neural network. One form of neural network is referred to as a multilayer perceptron (MLP) network. The topology of an MLP neural network is illustrated in FIG. 2. The MLP network includes an input layer 24, an output layer 26 and at least one hidden layer 28. These layers are formed from a plurality of neurons 22. The input layer 24 receives input parameters and distributes these parameters to each neuron 22 in the first hidden layer 28. The hidden layers 28 process this data and establish probability estimates for each of a plurality of output neurons which make up the output layer 26.

Within the MLP network, each single neuron 22 is a discrete processing unit which performs the discriminant function by first performing a linear transformation and then a nonlinear transformation on the input variable x as follows:

$$u_k = \varphi(W_k^T x + W_{kO}) = \varphi\left(\sum_{j=1}^{d} w_{kj} x_i + w_{kO}\right) \quad \text{Eq. 1}$$

Where φ is a nonlinear function having the form:

$$\varphi(v) = \frac{1}{1 + \exp(-v)} \quad \text{Eq. 2}$$

The general network function for the MLP neural network of FIG. 2 is as follows:

$$y_k = \varphi\left\{\sum_s w_{ks}^{(2)} \varphi\left[\sum_q w_{sq}^{(1)} \varphi\left(\sum_j w_{qj}^{(0)} x_j + w_{qo}^{(0)}\right) + w_{so}^{(1)}\right] + w_{ko}^{(2)}\right\} \quad \text{Eq. 3}$$

Once a network topology is established, it is necessary to "train" the network by applying previously collected training data to the input layer 24 and output layer 26 of the neural network. Optimal network parameters, or interneural weights, are estimated from this known training data. Preferably this is accomplished using a back propagation method. In this process, known data is applied to the input of the neural network and is propagated forward by applying the network equation as previously stated in equation 3. The input data results in output vectors for each layer of the MLP network. The output vectors are evaluated for all output neurons and are propagated backward to determine errors for the hidden neurons. During this process, the weights associated with each interneural link are adjusted to minimize the resultant errors. This process is iterated until the weights stabilize over the set of training data.

The error function within the neural network may be defined by a sum of square difference function between the desired output, $o_k$ (n), and the network's actual output, $y_k$ (n). This equation may be stated as:

$$E(W) = \frac{1}{2N} \sum_{n=1}^{N} \sum_{k=1}^{C} [o_k(n) - y_K(n)]^{(2)} \quad \text{Eq. 4}$$

To minimize this error function, a gradient descent method well known in the art may be used. In applying the gradient descent method, an adjustment which is made to a weight (ΔW) at iteration n+1 is proportional to the size, yet opposite in direction, to the partial derivative of the error function with respect to the weight at the previous (n) iteration. This can be stated as:

$$\Delta w_{kj}(n+1) = -\eta \partial E(n)/\partial w_{kj}^{(1)}(n) \quad \text{Eq. 5}$$

where η is a small positive constant which is denoted as the learning rate. The learning rate is a critical parameter within the MLP network. Selecting η to be too large may cause the network to become unstable or oscillatory. On the other hand, if η is too small, the networks learning performance will be slow. To achieve an optimal learning rate, a portion of the previous delta weight is added to the current delta weight to give the following generalized delta rule:

$$\Delta w_{kj}^{(1)}(n) = -\eta \frac{\partial E(n)}{\partial w_{kj}^{(1)}(n)} + \alpha \Delta w_{kj}^{(1)}(n-1) \quad \text{Eq. 6}$$

where α is a small positive constant which is denoted as the momentum.

A second neural network topology known in the prior art is referred to as a radial basis function (RBF) network. A typical RBF network is illustrated in FIG. 3. The RBF network models discrimination functions by performing a non-linear transformation on a linear combination of a set of local kernels or basis functions as follows:

$$y_k(x) = \phi(\Sigma w_{kj} g_j(x) + w_{ko}) \quad \text{Eq. 7}$$

where φ is the same as that in Equation 2 and $g_j$ is a Gaussian basis function of the form, $$g_j(x) \exp\left(\frac{\|x - \mu_j\|^2}{2\sigma_j^2}\right) \quad \text{Eq. 8}$$

where $\mu_j$ are centre vectors of the network and $\sigma_j$ are widths associated with the network.

The pictorial diagram of FIG. 3 represents the above formulae graphically. The output from a hidden or RBF node is determined by the distance in Equation 8 from an input vector x to a centre or pattern vector $\mu_j$. The basis functions are combined and transformed at the output layer.

For computational efficiency, a Moody-Darken learning method known in the art may be used for the optimization of network parameters. In this method, the network training involves both unsupervised and supervised stages. In the unsupervised learning stage, the centre vectors, $\mu_j$, are determined by using an adaptive K-mean clustering algorithm. The widths, $\sigma_j$, are estimated based on the distances between each centre vector and its nearest neighbours. The second stage supervised learning determines the weights from the hidden layer to the output layer using a gradient descent method similar to that for MLP networks discussed above.

In accordance with a first aspect of the present invention, there is provided a diagnostic system for locating faults within a telecommunications system, the diagnostic system comprising:

a remote test unit, the remote test unit being operatively coupled to the telecommunications system and obtaining parametric data therefrom; and a neural network, the neural network being responsive to the parametric data from the remote test unit, classifying the parametric data to at least one of a plurality of fault locations, and generating an output signal indicative of the fault location.

In accordance with a second aspect of the present invention, there is provided a method of locating faults within a telecommunications system, the method comprising the steps of:

a) measuring a plurality of parameters associated with the telecommunications system;

b) normalizing the measured parameters; and c) classifying the normalized parameters as probabilities associated with a plurality of fault locations.

The present invention provides an apparatus and method which achieves improved fault location in a telecommunications system.

The present invention typically provides a system which uses previous fault data and present measured data to diagnose faults within a telecommunications system.

The present invention typically provides a system which can accurately classify a fault mode in a telecommunications system.

The present invention also typically provides a system which can use previous fault data to alter the boundaries of fault decisions within a telecommunications diagnostic system.

The telecommunications fault diagnostic system is formed having a remote test unit (RTU) operatively coupled to a neural network. The RTU, which is conventional in the field of telecommunications diagnostics, is operatively coupled to a telecommunications system through a local exchange. The RTU generates test signals and measures system parameters such as resistance, capacitance, voltage, etc.

The neural network is operatively coupled to the RTU and receives the system parameter data therefrom. The neural network is a trained, and dynamically trainable, processing system which is formed from a plurality of interconnected processing units, or neurons. The neurons are organized in one or more processing layers. System parameter data is applied to a first processing layer, or input layer. From the input layer, data is distributed to one or more hidden layers of neurons. Based on weights, which are learned by the neural network during "training," each neuron makes a decision on the data which it receives. The decisions from the interconnected neurons are applied to an output layer which assigns the final probability for each fault type and location. Exemplary outputs from the output layer include the respective probabilities for a fault being located in one of the exchange, the lines, or the customer apparatus within a telecommunication system.

The neural network is "trained" using historical fault data which is collected from an RTU and stored in a database. By evaluating many measurements, along with associated fault types and locations, the neural network is able to assign the proper weights to attribute to each neuronal interconnect within the neural network. The neural network may also be easily retrained to adapt to new data.

These and other objects, features and advantages of the present invention will become apparent from the following detailed description of illustrative embodiments thereof, which is to be read in connection with the accompanying drawings.

Figure 4:
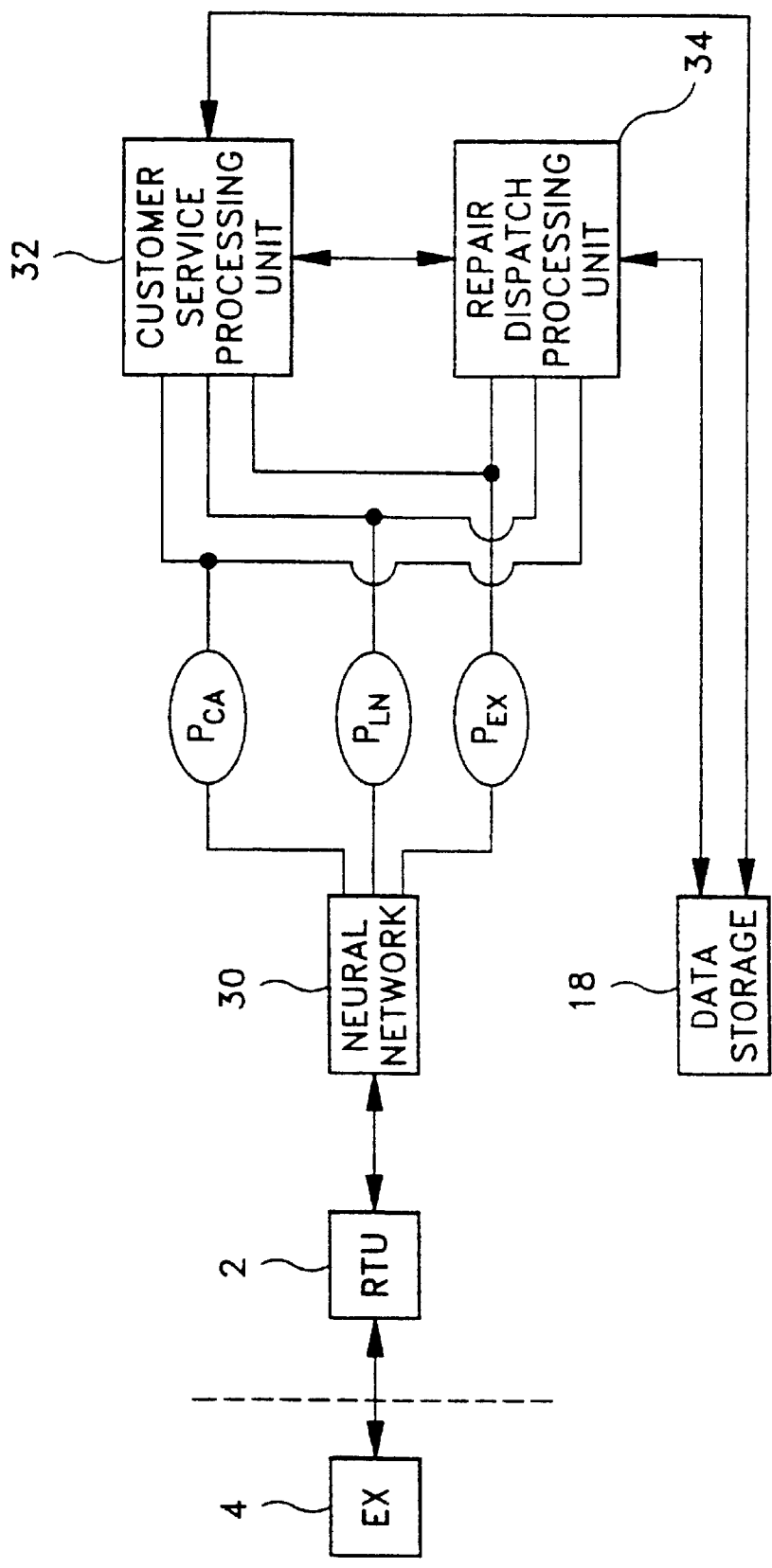
FIG. 4 is a block diagram of a telecommunications diagnostic system employing a neural network, and formed in accordance with the present invention.

A telecommunications diagnostic system formed in accordance with the present invention is illustrated in FIG. 4. The block diagram of FIG. 4 includes a remote test unit (RTU) 2 which is operatively coupled to the telecommunications system via a local exchange 4. The RTU 2 is substantially equivalent to that used in the LTS system known in the prior art. The RTU 2 induces test signals into the telecommunications system and measures system parameters in response thereto.

Figure 5:
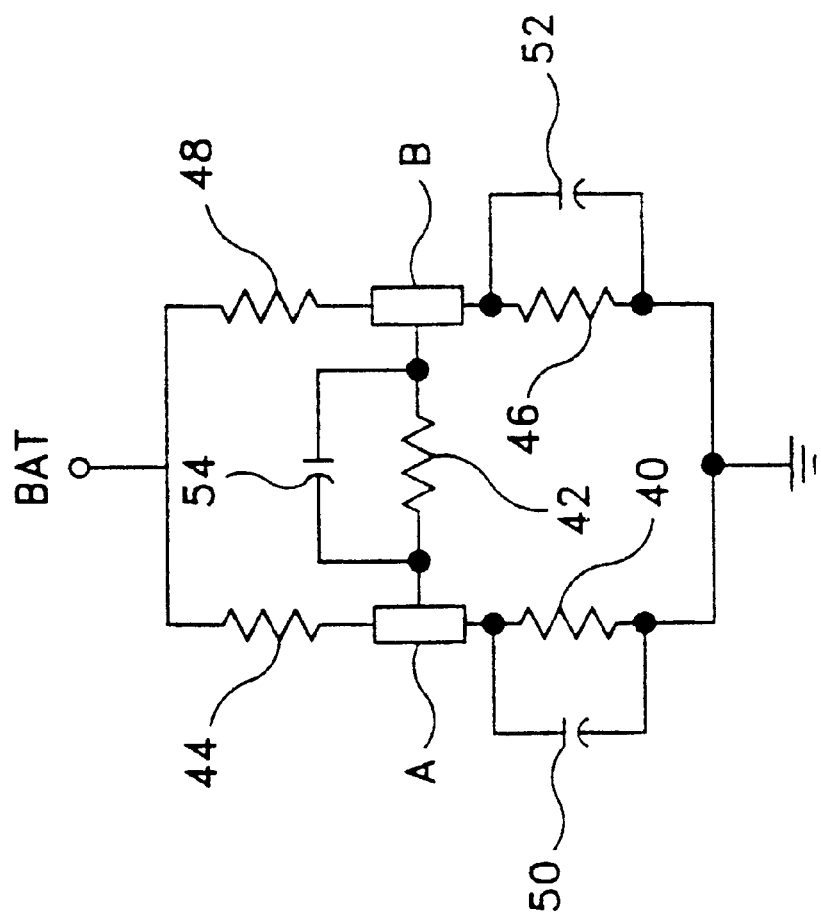
FIG. 5 is a schematic diagram illustrating an electrical model of a pair of lines used in a telecommunication system.

FIG. 5 illustrates a simplified electrical model of the system parameters for two adjacent telecommunication lines. Referring to FIG. 5, the two adjacent lines, designated A and B, may be characterized in part by a plurality of resistance values. Typical resistance measurements performed by the RTU 2 include: line A to earth ground ($R_{AG}$) 40, line A to line B ($R_{AB}$) 42, line A to battery ($R_{AV}$) 44, line B to earth ground ($R_{BG}$) 46, line B to line A ($R_{BA}$) 42, and line B to battery ($R_{BV}$) 48.

The capacitance values associated with lines A and B are also illustrated in FIG. 5. The RTU 2 is capable of measuring the capacitance from line A to earth ground ($C_A$) 50, from line B to earth ground measurements, ($C_B$) 52 and from line A to line B ($C_{AB}$) 54. The RTU 2 also provides a ratio of capacitance Ca/Cb. In addition, the RTU can also measure the voltage from line A to earth ground ($V_A$), from line B to earth ground ($V_B$) and from line A to line B ($V_{AB}$).

Returning to FIG. 4, the RTU 2 is operatively coupled to a neural network 30. The neural network 30 is a data processing system, preferably organized in parallel. The neural network 30 may generally take the form of any topology known in the art.

Figure 1:
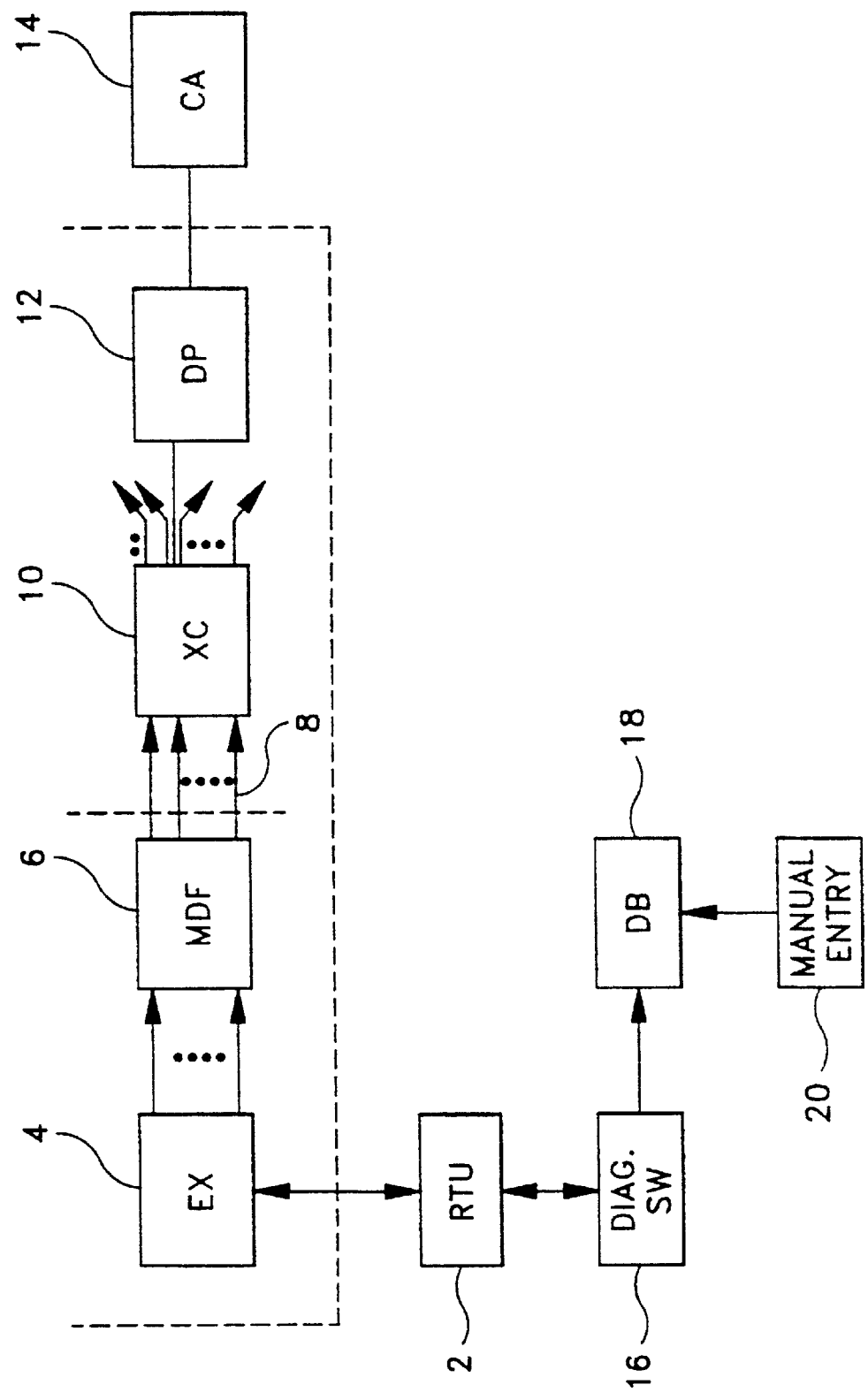
FIG. 1 is a block diagram of a telecommunications diagnostic system known in the prior art.
Figure 6:
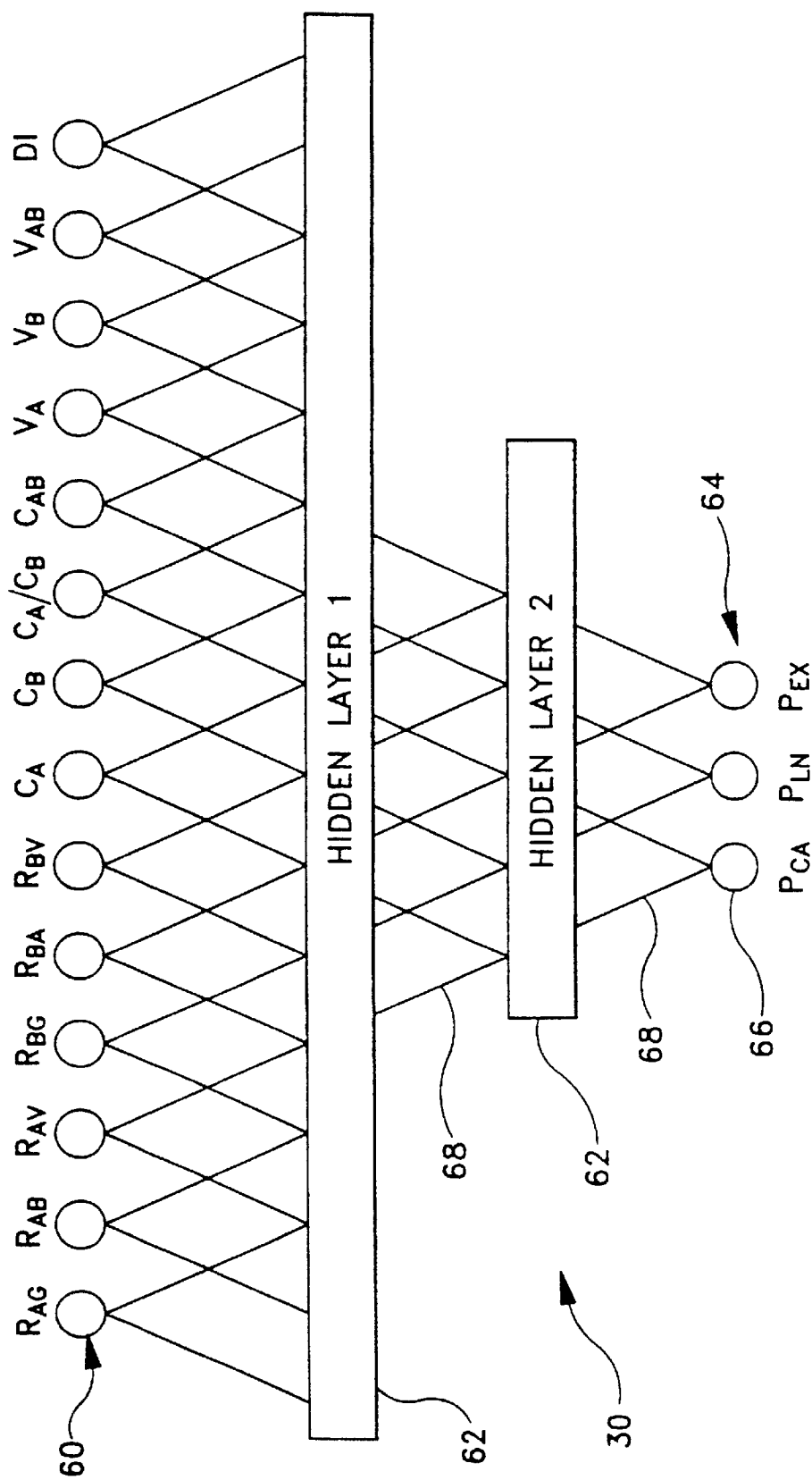
FIG. 6 is a pictorial diagram of a neural network having an input layer, an output layer and two generalized hidden layers.

A generalized topology of the neural network 30 is illustrated in FIG. 6. The neural network 30 includes an input layer 60 which is operatively coupled to the RTU 2 and receives the measured system parameters therefrom. The neural network 30 further includes one or more hidden processing layers 62 and an output layer 64. As in the prior art, each layer is composed of a plurality of processing neurons which are interconnected via weighted links 68. The output layer 64 preferably includes three probability outputs. These outputs preferably indicate the presence of a fault in either the customer apparatus 14, a telecommunications line 8 or the exchange 4 (FIG. 1).

Referring to FIG. 4, the telecommunications diagnostic system of the present invention further includes a data storage device 18. The data storage device 18 contains a historical database of fault data including measured system parameters, customer complaint data and fault clear-off codes. The clear-off codes are entered by service personnel after a fault has been repaired and indicate the actual location of the fault.

Figure 7:
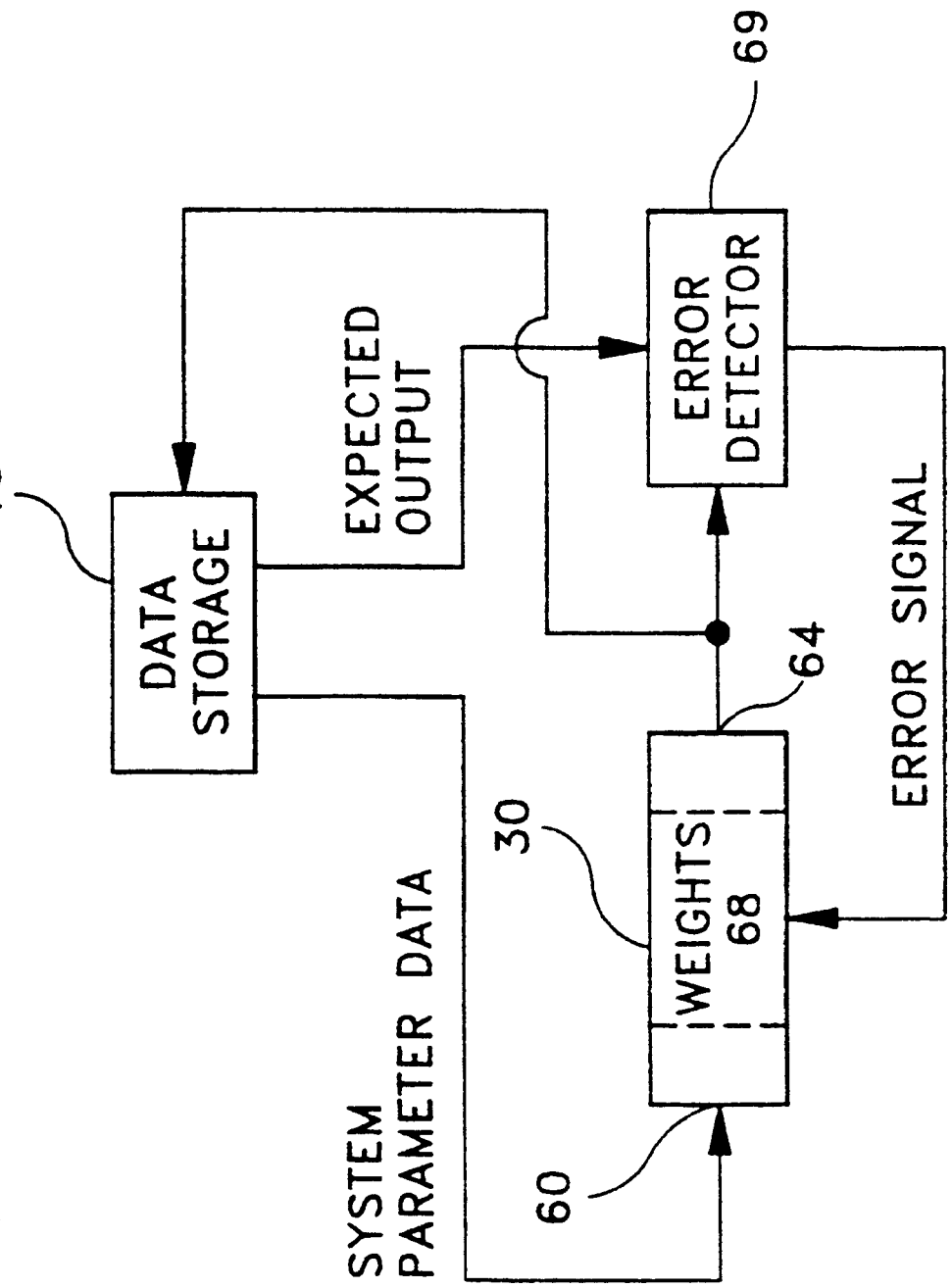
FIG. 7 is a block diagram illustrating the interconnection of the neural network and data storage device used to facilitate training of the network in one embodiment of the present invention.

The data storage device 18 is operatively coupled to the neural network 30. A simplified block diagram illustrating a preferred interconnection of the data storage device 18 and neural network 30 is illustrated in FIG. 7. The input layer 60 of the neural network 30 receives data from the data base for network training. The neural network 30 may also store current fault data in the data storage device 18 to enhance the historical data base for continuous adaptive learning.

Figure 8:
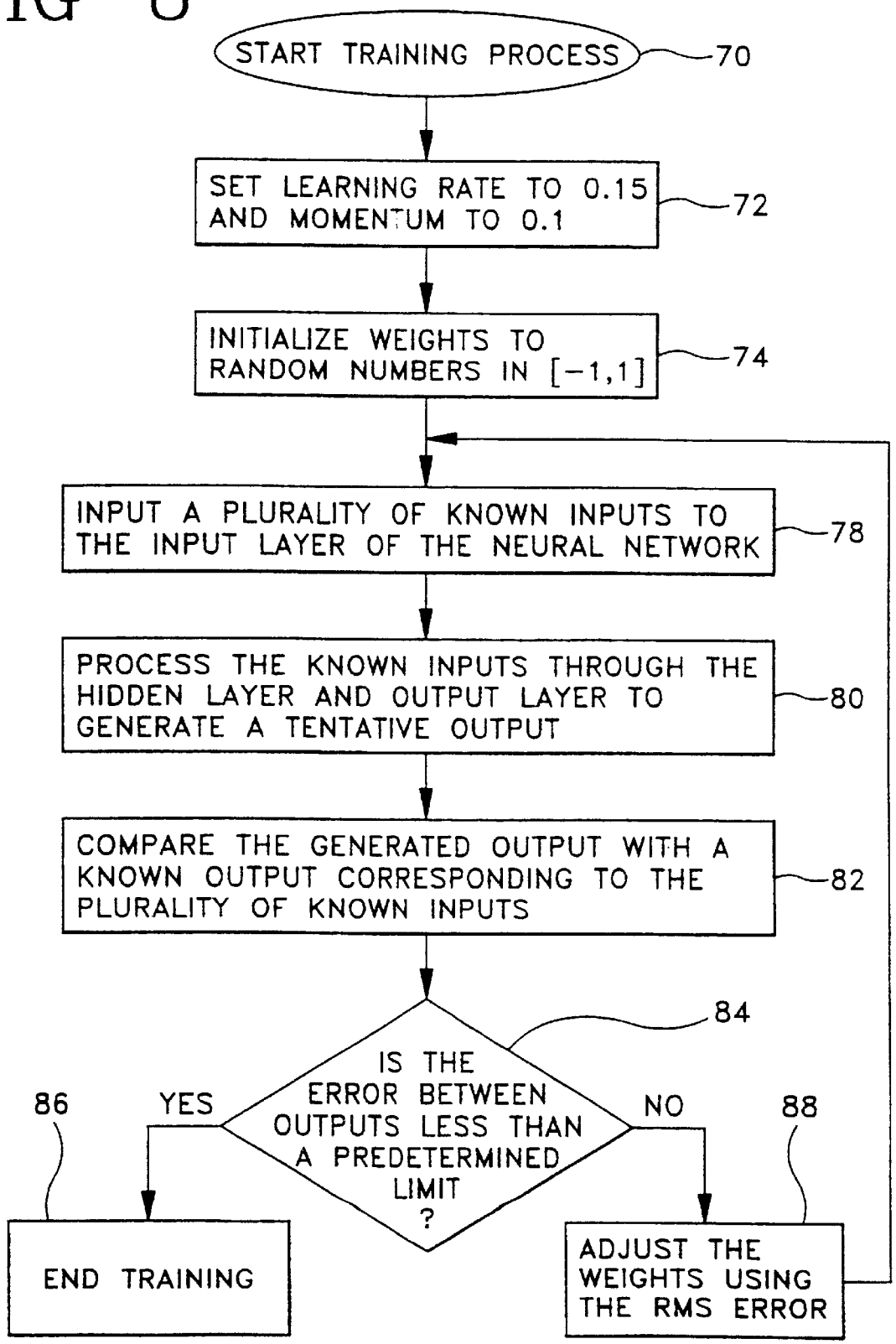
FIG. 8 is a flow chart illustrating the steps involved in training a neural network in accordance with the present invention.

The process of training the generalized neural network 30 is described in connection with the block diagram of FIG. 7 and the flow chart illustrated in FIG. 8. After training begins (step 70), the learning rate and momentum factors are set for the network (step 72). Each weighted link 68 (FIG. 6) is then randomly set to a normalized value in the range of −1 to 1 (step 74).

Training is performed in an iterative, closed loop. The loop, or epoch, begins by loading the first set of historical data from the data storage device 18 into the input layer 60 of the neural network (step 78). This data is processed by the network in accordance with the randomly initialized weights assigned to the links 68. This processing generates a tentative output at the output layer 64 (step 80). An error detector 69 compares the initial output against the expected output (clear-off code) for the corresponding input data in step 82 and an error signal is generated. The magnitude of the error signal is compared to an acceptable error limit. If the error is acceptable, training is complete (step 84). If the error exceeds the acceptable limit, the weights 68 are adjusted (step 88). After the weights 68 are adjusted, a new epoch begins from step 78 for the next set of data in the historical data base.

To achieve optimal training of the neural network 30, the historical fault data is preferably pre-processed before training begins. Because the fault data is measured data from a real system, the data is subject to noise and other sources of unreliability. Pre-processing the data serves to eliminate these erroneous data sets which would adversely affect network 30 training.

Once trained, the neural network 30 is capable of processing measured data and classifying the data into probabilities of fault locations. This information is available on an output layer of the neural network 30. Preferred fault classifications include customer apparatus ($P_{CA}$), line ($P_{LN}$) and exchange ($P_{EX}$).

Returning to FIG. 4, the telecommunications fault diagnostic system of the present invention further includes a customer service processing unit (CSP) 32. The CSP 32 receives the fault classification data from the neural network 30 and provides this information on a user interface console, such as a personal computer or data terminal. In addition to facilitating the display of the probable fault location, the CSP 32 preferably includes an input device, such as a keyboard. From the input device, an operator may enter appropriate customer complaint information. This information is then added to the historical database of the data storage device 18.

The telecommunications fault diagnostic system preferably includes a repair dispatch processing unit (RDP) 34. The RDP 34 receives the fault location data from the neural network 30 and provides this information on a user interface console, such as a personal computer or data terminal. From this information, service personnel are dispatched in accordance with the indicated fault location. In addition to displaying fault data, the RDP 34 preferably includes an input device, such as a keyboard. From the input device, the operator may enter appropriate information regarding the resolution of the detected fault (clear-off code). This information is then added to the historical database of the data storage device 18. In many cases, the RDP 34 and CSP 32 may be integrated into a single station.

Neural Network Topology

The present invention addresses the problem of fault location in a telecommunications system as a classification problem. As such, the topology of neural network 30 is chosen to optimize the classification of the various fault parameters to one of a fixed number of possible fault locations. The MLP (FIG. 2) and RBF (FIG. 3) network topologies are preferred for implementing the present invention.

Figure 2:
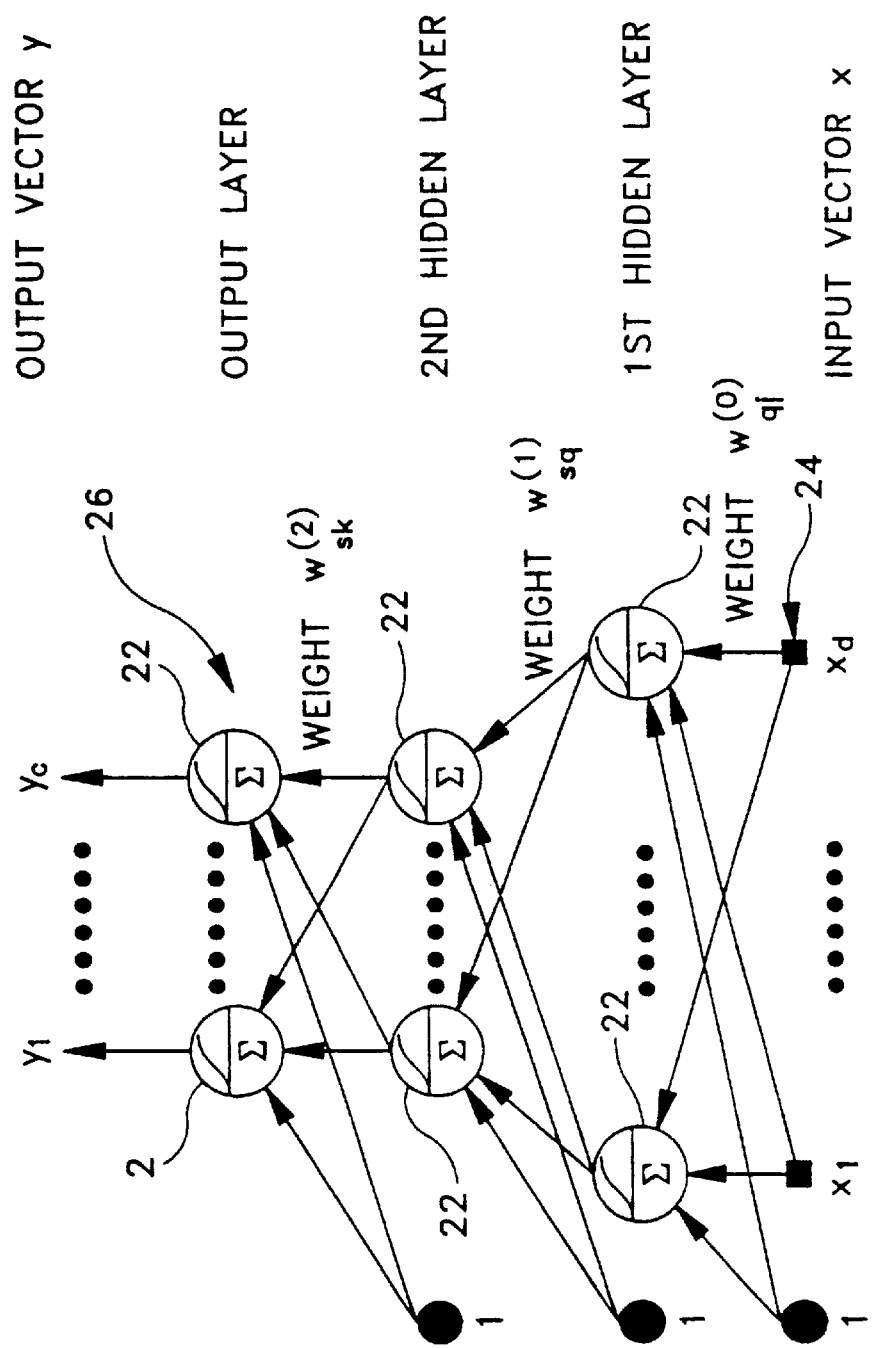
FIG. 2 is a pictorial diagram of a generalized multi layer perceptron neural network known in the prior art.
Figure 3:
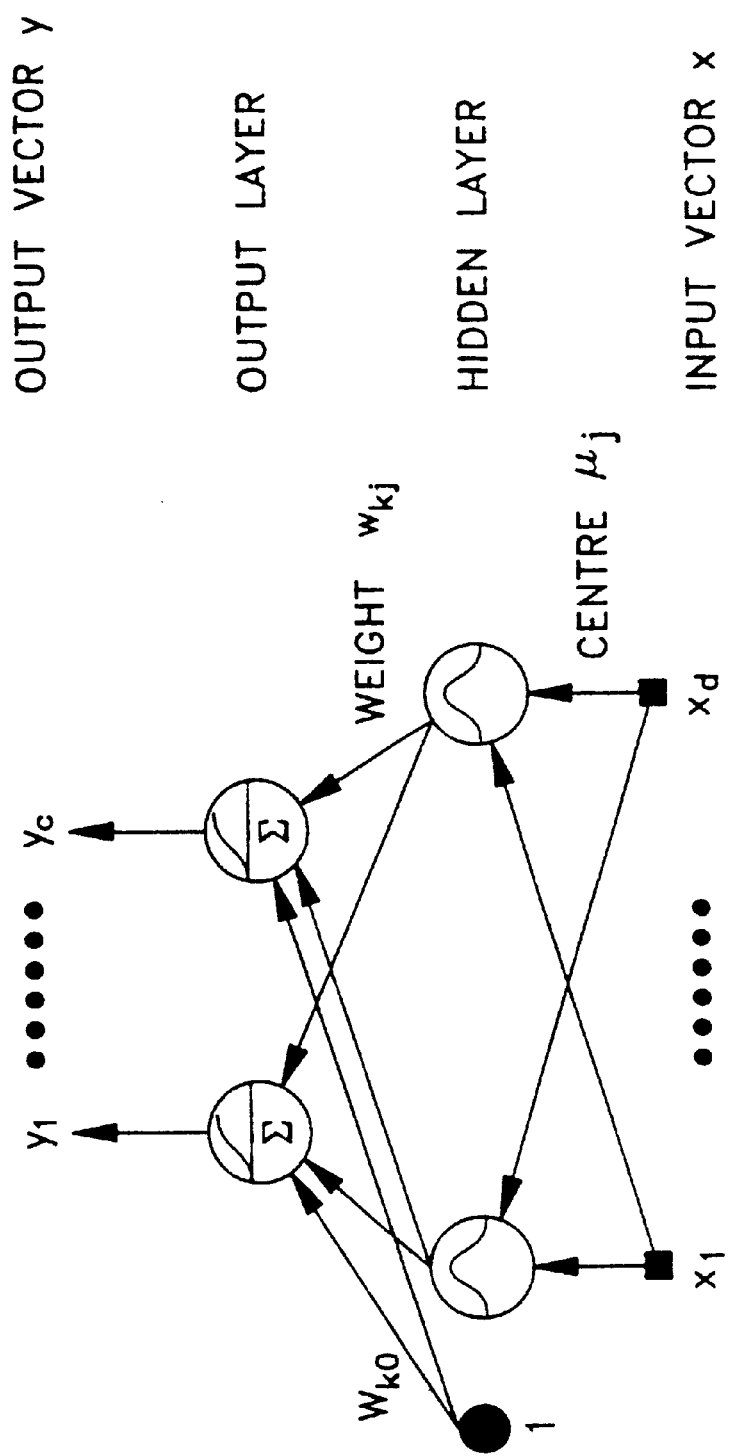
FIG. 3 is a pictorial diagram of a generalized radial basis function neural network known in the prior art.

The MLP network of FIG. 2 includes two hidden layers and an output layer of processing neurons. Implementation of this network requires defining system parameters to be input to the network, the fault classes to be output from the network, and the topologies of the hidden layers between the input and output layers. Referring to the generalized neural network model of FIG. 6, the input layer 60 preferably receives fourteen measured values from the RTU 2 as inputs. The output layer 66 of the neural network represents probabilities of a fault being located in the customer apparatus ($P_{CA}$) the telecommunications lines ($P_{LN}$) and the communications exchange ($P_{EK}$).

The neural network classifies data as probability functions. Therefore, it is desirable for the input data to be normalized in the range of minus one (−1) to one (1). The measured input data of resistance and capacitance vary over a significant range. Resistance values vary in the telecommunications system from a few ohms ($\Omega$) to several million ohms (meg $\Omega$). Capacitance values vary from a few nano farads to $10^4$ nano farads. The service clear-off codes take the form of discrete values in the range of 0–30. Fault reports from customers are input as symbolic data.

Normalization requires coding the symbolic data into a discrete numeric representation and scaling the measured data into the range of −1 to 1. Preferably, the data is normalized with respect to both mean and variance values of individual measurements. However, other normalization methods such as simple normalization with respect to minimum and maximum values, or normalizing the data with respect to both mean and covariance matrices of all measurements may also be used.

The topology of the hidden layers 62 is selected to strike a balance between the classification performance, the training time and the available processing power of the neural network. As an example, an MLP network may be formed in accordance with the present invention having a first hidden layer with 75 neurons and a second hidden layer with 20 neurons. This topology is denoted as 75:20. In evaluating this network, three parameters are adjusted to optimize the classification performance. These parameters are the learning rate $\eta$, the momentum $\alpha$ and the decaying factor. For this network, it was determined that a learning rate of about 0.15 and a momentum factor of about 0.1 achieved optimal performance. If $\eta$ is made large, e.g., 0.3–0.4, the network becomes unstable. On the other hand, small values of $\eta$, e.g., 0.05 resulted in longer learning times.

Applying these parameters to an MLP network results in significant improvements in fault classification over the prior art LTS. The MLP network was modeled using Neural Works Professional II/Plus (TM) and Neural Works explorer (TM) software (manufactured by Neural Works, Inc. of Pittsburg, Pa.) running on a personal computer. Over a sampling of 18,962 sets of fault data, the present invention was able to properly classify 76.4% of the fault cases correctly. This compares to a 68.3% overall correct classification rate by the LTS known in the prior art. This represents a net improvement of 8.1%.

While the MLP network alone achieved an 8.1% improvement over a conventional LTS, it has been found that the heuristic decision rules used in prior art LTS systems have some rules which perform very well. Therefore, by forming a telecommunications diagnostic system which integrates the neural network of FIG. 6 with a conventional LTS (FIG. 1), even higher performance is achieved. Such integrated systems are illustrated in FIGS. 9 and 10.

Figure 9:
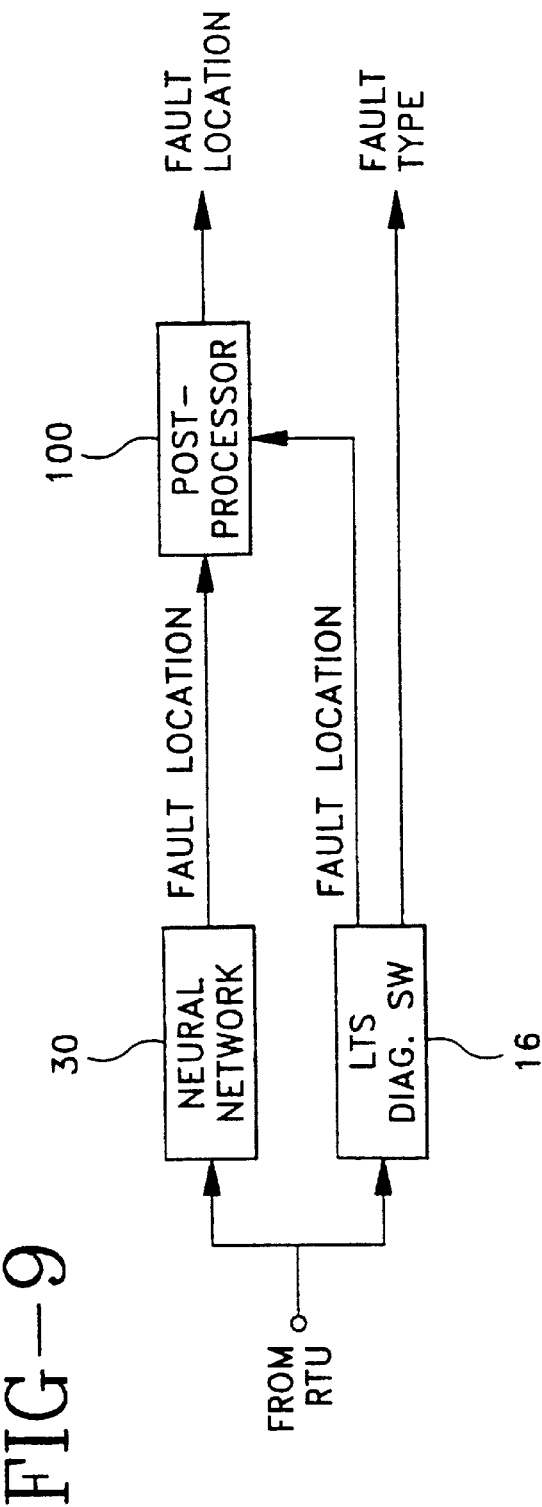
FIGS. 9 and 10 are block diagrams of integrated telecommunication diagnostic systems, formed in accordance with the present invention.

Referring to FIG. 9, a telecommunications fault diagnostic system is illustrated with a neural network 30 operating in parallel with conventional LTS diagnostic software 16. Both processing systems simultaneously receive the measured system data from an RTU 2 and generate fault diagnostic output data. The neural network 30 and diagnostic software 16 each generate a fault location output signal. The fault location output signal from each processing system is received by a post processor 100. The post processor 100 selectively routes the fault location signal from either the neural network 30 or LTS diagnostic software 16 to a fault location output. The LTS diagnostic software 16 also calculates a fault type signal. This signal is presented directly on a fault type output. This method of integration improves the diagnostic performance of the MLP neural network by approximately 0.4%.

Figure 10:
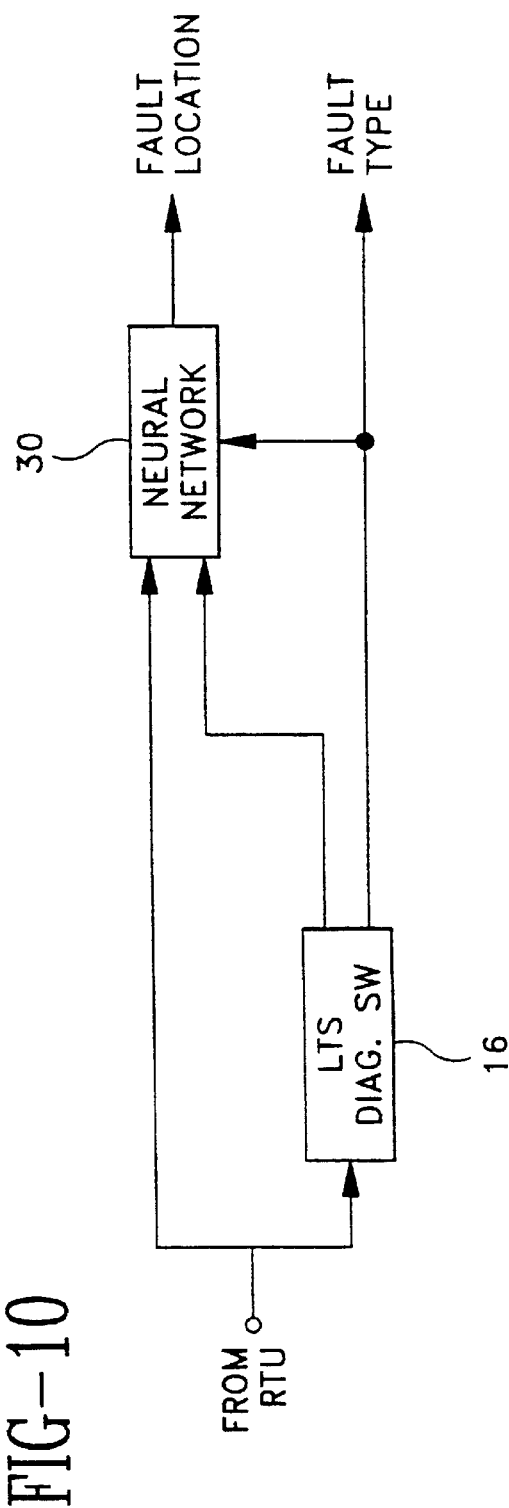

An alternate embodiment of an integrated telecommunications diagnostic system formed in accordance with the present invention is illustrated in FIG. 10. As with FIG. 9, this topology features the parallel operation of a neural network 30 and convention LTS diagnostic software 16. However, rather than employing a post processor 100, the input layer 60 of the neural network 30 is expanded to accept the fault location and fault type output signals from the LTS diagnostic software 16. The fault location output is derived from the neural network output layer 66. The fault type output is received directly from the LTS diagnostic software 16. This configuration requires a more complex neural network 30 but eliminates the post processor 100. This integration topology yielded a 0.5% improvement in classification rate over the MLP neural network 30 standing alone.

While not illustrated, it should be understood that the embodiments illustrated in FIGS. 9 and 10 preferably include a data storage device 18, a customer service processor 32 and/or a repair dispatch processor 34 as discussed in connection with FIG. 4.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A diagnostic system for locating faults within a telecommunications system, the diagnostic system comprising:
   a remote test unit, the remote test unit being operatively coupled to the telecommunications system and obtaining parametric data therefrom; and
   a neural network, the neural network being responsive to the parametric data from the remote test unit, classifying the parametric data to at least one of a plurality of fault locations, and generating an output signal indicative of the fault location.

2. A diagnostic system as defined by claim 1, further comprising:
   a linear decision diagnostic processor (LDDP), the LDDP being responsive to the parametric data and generating a fault location signal and fault type signal therefrom;
   a post processor, the post processor receiving the output signal from the neural network and the fault location signal and fault type signal from the LDDP and generating a diagnostic fault location output signal therefrom; and
   an output device, the output device receiving the diagnostic fault location output signal from the post processor and the fault type signal from the LDDP, the output device indicating the fault location and type, whereby service personnel may be efficiently dispatched to service a detected fault.

3. A diagnostic system as defined by claim 1, further comprising:
   a linear decision diagnostic processor (LDDP), the LDDP being responsive to the parametric data and calculating a fault location signal and fault type signal therefrom;
   the neural network being responsive to the parametric data from the remote test unit and the fault location and fault type signals from the LDDP, the neural network classifying the parametric data and received signals to at least one of a plurality of fault locations and generating an output signal indicative of the at least one fault location; and
   an output device, the output device receiving the output signal from the neural network and the fault type signal from the LDDP, the output device displaying the fault location and fault type, whereby service personnel may be efficiently dispatched to service a detected fault.

4. A diagnostic system as defined by claim 1, 2, or 3 wherein the parametric data includes a plurality of resistance, capacitance and voltage measurements and a termination signal.

5. A diagnostic system as defined by claim 4, wherein the plurality of fault locations indicate a fault in at least one of a telecommunication line, a telecommunication exchange, and a customer apparatus.

6. A diagnostic system as defined by claim 5, wherein the neural network comprises a multi layer perceptron formed from a plurality of processing neurons.

7. A diagnostic system as defined by claim 6, wherein the multi layer perceptron includes a first hidden processing layer and a second hidden processing layer.

8. A diagnostic system as defined by claim 7, wherein the first hidden processing layer comprises a number of neurons substantially equal to 75 and the second hidden processing layer comprises a number of neurons substantially equal to 20.

9. A diagnostic system as defined by claim 8, further comprising a data storage device, the data storage device comprising a data base of historical fault data, the neural network being operatively coupled to the data storage device and receiving the historical fault data during a network training operation.

10. A method of locating faults within a telecommunications system, the method comprising the steps of:
    a) measuring a plurality of parameters associated with the telecommunications system;
    b) normalizing the measured parameters; and
    c) classifying the normalized parameters as probabilities associated with a plurality of fault locations.

11. A method as defined by claim 10, wherein the plurality of parameters in step a) include a plurality of resistance values, a plurality of capacitance values, a plurality of voltage values, and a termination signal.

12. The method as defined by claim 11, wherein the plurality of fault locations include a telecommunication line, exchange and customer apparatus.

* * * * *

UNITED STATES PATENT AND TRADEMARK OFFICE
CERTIFICATE OF CORRECTION

PATENT NO.  : 6,636,841 B1
DATED       : October 21, 2003
INVENTOR(S) : Austin et al.

It is certified that error appears in the above-identified patent and that said Letters Patent is hereby corrected as shown below:

Column 3,
Line 8, now reads:
$$u_k = \varphi(W_k^T x + W_{ko}) = \varphi\left(\sum_{j=1}^{d} w_{kj} x_i + w_{ko}\right) \qquad \text{Eq. 1}$$

should read:
$$u_k = \varphi(W_k^T x + W_{ko}) = \varphi\left(\sum_{j=1}^{d} w_{kj} x_j + w_{ko}\right) \qquad \text{Eq. 1}$$

Line 12, now reads: "Where $\phi$ is a nonlinear function having the form;"
should read: -- Where $\varphi$ is a nonlinear function having the form: --

Column 4,
Line 16, now reads: "$y_k(x) = \phi(\sum w_{kj} g_j(x) + w_{ko})$          Eq. 7"

should read:  $y_k(x) = \varphi(\sum w_{kj} g_j(x) + w_{ko})$          Eq. 7

Line 18, now reads: "where φ is the same as that in Equation 2 and $g_j$ is a Gaussian basis function of the form,"
should read: -- where $\varphi$ is the same as that in Equation 2 and $g_j$ is a Gaussian basis function of the form, --
Line 23, now reads:
$$g_j(x) \exp\left(\frac{\|x - \mu_i\|^2}{2\sigma_j^2}\right) \qquad \text{Eq. 8}$$

should read:  $g_j(x) = \exp\left(\dfrac{\|x - \mu_j\|^2}{2\sigma_j^2}\right)$          Eq. 8

Signed and Sealed this

Twenty-fourth Day of August, 2004

JON W. DUDAS
*Director of the United States Patent and Trademark Office*